United States Patent
Koenig

(10) Patent No.: US 8,080,969 B2
(45) Date of Patent: Dec. 20, 2011

(54) TORQUE HARMONIC REDUCTION CONTROL FOR SWITCHED RELUCTANCE MACHINES

(75) Inventor: Andreas C. Koenig, Machesney Park, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 407 days.

(21) Appl. No.: 12/483,033

(22) Filed: Jun. 11, 2009

(65) Prior Publication Data
US 2010/0315030 A1   Dec. 16, 2010

(51) Int. Cl.
*H02P 3/18* (2006.01)
(52) U.S. Cl. .................................. 318/701; 318/432
(58) Field of Classification Search .................. 318/701, 318/432, 434, 459, 500, 601, 609, 610
See application file for complete search history.

(56) References Cited

U.S. PATENT DOCUMENTS

| | | | |
|---|---|---|---|
| 4,961,038 A | 10/1990 | MacMinn | |
| 5,204,604 A * | 4/1993 | Radum | 318/701 |
| 5,852,355 A | 12/1998 | Turner | |
| 5,998,952 A * | 12/1999 | McLaughlin et al. | 318/432 |
| 6,359,415 B1 * | 3/2002 | Suzuki et al. | 318/727 |
| 6,646,407 B2 * | 11/2003 | Rahman et al. | 318/701 |
| 6,653,829 B1 * | 11/2003 | Henry et al. | 324/207.21 |
| 6,756,757 B2 | 6/2004 | Marcinkiewicz et al. | |
| 6,822,417 B2 * | 11/2004 | Kawaji et al. | 318/701 |
| 6,982,537 B2 * | 1/2006 | Islam et al. | 318/701 |
| 7,095,205 B2 | 8/2006 | Ehsani et al. | |
| 7,101,310 B2 | 9/2006 | Smith et al. | |
| 7,119,512 B2 | 10/2006 | Green | |
| 2003/0218444 A1 | 11/2003 | Marcinkiewicz et al. | |
| 2008/0129244 A1 | 6/2008 | Randall | |
| 2008/0157706 A1 | 7/2008 | Loudot | |

OTHER PUBLICATIONS

P.L. Chapman, et al., "Design and Precise Realization of Optimized Current Waveforms for an 8/6 Switched Reluctance Drive," IEEE Trans. on Power Electronics, vol. 17, pp. 76-83.

H.C. Lovatt, et al., "Computer-optimised smooth-torque current waveforms for switched-reluctance motors," IEE Proc. On Electric Power Applications, vol. 144, Sep 1997, pp. 310-316.

N.T. Shaked, et al., "New Procedures for Minimizing the Torque Ripple in Switched Reluctance Motors by Optimizing the Phase-Current Profile," IEEE Trans. On Magnetics, vol. 41, Mar. 2005, pp. 1184-1192.

L.O. Porto Henriques, et al., "Proposition of an Offline Learning Current Modulation for Torque-Ripple Reduction in Switched Reluctance Motors: Design and Experimental Evaluation," IEEE Trans. On Indust. Electron., vol. 49, Jun. 2002, pp. 665-678.

M.E. Zaim, et al., "Design for Torque Ripple Reduction of a Three-Phase Switched-Reluctance Machine," IEEE Trans. On Magnetics, vol. 38, Mar. 2002, pp. 1189-1192.

C. Changhwan, et al., "A new performance estimation method for a switched reluctance motor without the design process of the torque controller," IEEE Symposium on Industrial Electron, Jun. 2001, pp. 1163-1168.

(Continued)

*Primary Examiner* — Rina Duda
(74) *Attorney, Agent, or Firm* — Kinney & Lange, P.A.

(57) ABSTRACT

A controller for a switched reluctance machine (SRM) generates current commands that reduce torque harmonics generated by the SRM. The controller monitors the phase currents and rotor position of the SRM to estimate torque generated by the SRM. The current command signal is modified based on the difference between the torque command and the estimated torque. A multiplier that varies with the monitored torque command is applied to the modified current command to provide a smooth phase-to-phase transition.

19 Claims, 4 Drawing Sheets

OTHER PUBLICATIONS

K. Russa, et al., "Torque-Ripple Minimization in Switched Reluctance Machines Over a Wide Speed Range," IEEE Trans. on Industry Applications, vol. 34, Sep.-Oct. 1998, pp. 1105-1112.

R.B. Inderka, et al., "DITC-Direct Instantaneous Torque Control of Switched Reluctance Drives, " IEEE Trans. on Industry Aopplications, vol. 39, pp. 1046-1051.

S. Mir, et al., "Torque-Ripple Minimization in Switched Reluctance Motors Using Adaptive Fuzzy Control, " IEEE Trans. on Industry Applications, vol. 35 Mar./Apr. 1999, pp. 461-468.

P. C. Kjaer, et al., "High-Grade Control of Switched Reluctance Machines," IEEE Trans. on Industry Applications, vol. 33, pp. 1585-1593.

I. Agirman, et al., "Adaptive torque-ripple minimization in switched reluctance motors," IEEE Trans. On Industrial Electronics, vol. 48, Jun. 2001, pp. 664-672.

J.G. O'Donovan, et al., "Neural network based torque ripple minimisation in a switched reluctance motor, " 20th International Conference on Industrial Electron., 1994, pp. 1226-1231.

N. Inac, et al., "Torque Ripple Minimization of a Switched Reluctance Motor Including Mutual Inductances Via Sliding Mode Control Technique," Proc. of IEEE International Symp. on Indust. Electron., Jul. 1997, vol. 3, pp. 1024-1028.

J.C. Moreira, "Torque Ripple Minimization in Switched Reluctance Motors Via Bi-Cubic Spline Interpolation," IEEE Power Electron. Spec. Conf., vol. 2, Jun.-Jul. 1992, pp. 851-856.

D.S. Schramm, et al., "Torque Ripple Reduction of Switched Reluctance Motors by Phase Current Optimal Profiling," IEEE Power Electron, Spec. Conf., vol. 2, Jun.-Jul. 1992, pp. 857-860.

A.D. Cheok, et al., "A New Torque and Flux Control Method for Switched Reluctance Motor Drives, " IEEE Trans. On Power Electron., vol. 17, Jul. 2002, pp. 543-557.

M. Rodrigues, et al., "Fuzzy Logic Torque Ripple Reduction By Turn-Off Angle Compensation for Switched Reluctance Motors," IEEE Trans. On. Indust. Electron., vol. 48, Jun. 2001, pp. 711-715.

M.S. Islam, et al, "Torque-Ripple Minimization with Indirect Position and peed Sensing for Switched Reluctance Machines," IEEE Trans. On Industrial Electron., vol. 47, Oct. 2000, pp. 1126-1133.

M. S. Islam, et al., "A sensorless wide-speed range SRM drive with optimally designed critical rotor angles," IEEE Industrial Applications Conf., Oct. 2000, pp. 1730-1737.

B. GE et al., "Nonlinear internal-model control for switched reluctance drives, " IEEE Trans. On Power Electronics, vol. 17, May 2002, pp. 379-388.

K. M. Rahman et al., "High-performance fully digital switched reluctance motor controller for vehicle propulsion," IEEE Trans. On Industrial Applications, vol. 38, Jul.-Aug. 2002, pp. 1062-1071.

J.M. Stephenson et al., "Torque ripple minimization in a switched reluctance motor by optimum harmonic current injection," IEE Proced. On Electric Power Applic., vol. 148, Jul. 2001, pp. 322-328.

R.Inderka et al., "High-Dynamic Direct Average Torque Control for Switched Reluctance Drive," IEEE Trans. On Industrial Applications, vol. 39, Jul./Aug. 2003, pp. 1040-1045.

L. Venkatesha et al., "A Comparative Study of Pre-Computed Current Methods for Torque Ripple Minimisation in Switched Reluctance Motor," Proc. of Industry Applications Conf., vol. 1, Oct. 2000, pp. 119-125.

N. Nagel, et al., "Rotating Vector Methods for Smooth Torque Control of a Switched Reluctance Motor Drive, " IEEE Trans. On Industry Applications, vol. 36, Mar./Apr. 2000, pp. 540-548.

A. Koenig, et al., "Feedback-Based Mitigation of Torque Harmonics in Switched Reluctance Motor Drives," Proc. Of Applied Power Electron. Conf., Feb. 2007, pp. 383-389.

M. Moallem, et al., "Effect of Rotor Profiles on the Torque of a Switched Reluctance Motor," IEEE Trans. On Industry Applications, vol. 28, Mar./Apr. 1992, pp. 364-369.

J. Oh, et al., "New Rotor Shape Design of SRM to Reduce the Torque Ripple and Improve the Output Power, " Proc. of International Conference of Electrical Machines and Systems, vol. 1, Sep. 2005, pp. 652-654.

M. Balaji, et al., "Torque Ripple Minimization in Switched Reluctance Motor Drives, " Proc. of Conf. on Power Electron., Machines and Drives, vol. 1, Mar./Apr. 2004, pp. 104-107.

M.Hadef, et al., "A New Direct Torque Control Method for Switched Reluctance Motor Drives Compared with Vector Control," Asian Journal of Information Technology 6 (4): 2007, pp. 462-467.

Switched Reluctance Machine Background ISEA Course Text.

Switched Reluctance Machine Background Speed Theory.

Inderka et al.: "Generator Operation of a Switched Reluctance Machine Drive for Electric Vehicles;" 8th European Conference on Power Electronics and Applications. Brussels, BE, vol. CONF.8, Sep. 7, 1999.

Ooi et al.: "Sensorless Switched Reluctance Motor Drive With Torque Ripple Minimization;" Power Electronics Specialists Conference, Jun. 18-23, 2000.

Inderka et al.: "DITC—direct instantaneous torque control of switched reluctance drives;" Conference Record of the IEEE Industry Applications Conference. IAS Annual Meeting. vol. 3, Oct. 13, 2002.

Official Search Report and Written Opinion of the European Patent Office in counterpart foreign Application No. EP10251067, filed Jun. 10, 2010.

* cited by examiner

TORQUE HARMONIC REDUCTION CONTROL FOR SWITCHED RELUCTANCE MACHINES

BACKGROUND

The present invention is related to switched reluctance electric machines and in particular to a system and method of controlling switched reluctance machines.

Switched reluctance machines (SRM) are a simple, energy-efficient type of electromagnetic device. In particular, SRM devices do not require the use of windings or magnets in the rotor. Rather, SRMs make use of protuberances (i.e. poles) that are magnetically permeable. The stator coils are selectively energized to attract the nearest rotor pole (i.e., bring the rotor pole into alignment with the energized stator coil). By energizing the field coils in sequence, the rotation of the rotor can be selectively controlled. Torque generated by the SRM is controlled by selectively adjusting the magnitude of the current provided to the stator.

The problem with SRMs, when compared to other types of electromagnetic machines, is the torque provided by SRMs can include significant harmonic pulsations during normal operation with conventional excitation schemes. Prior art approaches to reducing torque pulsations in SRMs include both changes to the mechanical design of the machines as well as sophisticated control schemes used to shape the current profile provided to the stator of the SRM.

SUMMARY

A controller for a switched reluctance machine operates to minimize torque harmonics in the switched reluctance machine. The controller receives inputs representing the monitored phase currents provided to each phase of the SRM and the rotor position of the SRM. The controller estimates the torque generated by the SRM based on the monitored phase currents and the monitored rotor position. The estimated torque is compared with the commanded torque, and the difference or error is used to modify the current command. A multiplier that varies with the monitored rotor position is applied to the modified current command to provide a smooth phase-to-phase transition.

DETAILED DESCRIPTION

The present invention is directed to a control scheme for switched reluctance machines (SRM). Phase currents and rotor position are used to estimate the instantaneous torque of the SRM. The estimated torque is compared with the commanded torque to generate a difference or error signal. The current command is modified based on this error signal. In addition, the modified current command is further modified by a multiplier value that varies based on the monitored position of the rotor. As the rotor position approaches a turn-off angle for a particular phase, the multiplier decreases (e.g., from a value of one) such that the magnitude of the current command signal is decreased. This ensures a smooth phase-to-phase hand-off (i.e., transition from energizing a first stator coil to energizing a second stator coil).

Figure 1:
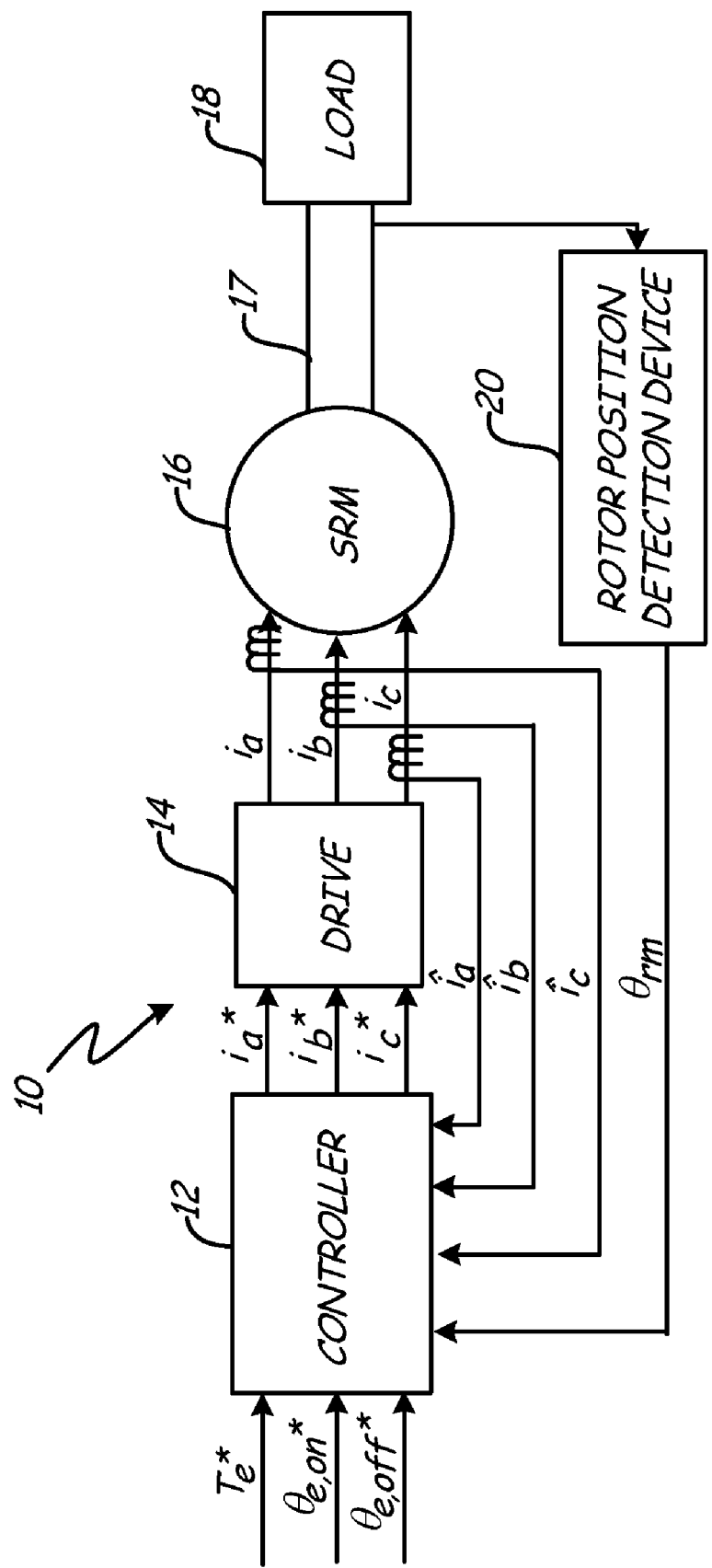
FIG. 1 is a block diagram illustrating a switched reluctance machine (SRM) system according to an embodiment of the present invention.

FIG. 1 is a block diagram illustrating switched reluctance machine (SRM) system 10 according to an embodiment of the present invention. System 10 includes controller 12, drive 14, switched reluctance machine (SRM) 16, shaft 17, load 18, and rotor position detection device 20. In the embodiment shown in FIG. 1, SRM 16 is a three-phase machine, although in other embodiments SRM 16 may include fewer phases (e.g., one or two phases) or more phases (e.g., four or five phases). SRM 16 includes stator field coils (not shown) that are sequentially energized to cause a rotor (not shown) to rotate. The rotor includes protuberances that act as poles (e.g., for a doubly-salient machine, two protuberances or poles would be employed) that are aligned with whichever stator field coil is energized at a particular time. Thus, by sequentially energizing the stator field coils, the rotor is caused to rotate and can be controlled to provide a desired amount of torque.

Controller 12 selectively controls the energizing of the stator field coils through current command signals provided to driver 14. Controller 12 receives as input torque command $T_e^*$, turn-on angle $\theta_{e,on}^*$, and turn-off angle $\theta_{e,off}^*$. In addition, controller 12 receives feedback in the form of monitored phase currents $\hat{i}_a$, $\hat{i}_b$, and $\hat{i}_c$ and rotor position $\theta_{rm}$. In response to these inputs, controller 12 generates current command signals $i_a^*$, $i_b^*$, and $i_c^*$ that are provided to drive 14. In response to the commanded currents, drive 14 generates phase currents $i_a$, $i_b$, and $i_c$ provided to SRM 16.

In response to the phase currents, the rotor portion of SRM 16 is caused to rotate, generating mechanical energy that is transferred via shaft 17 to load 18. Rotor position detection device 20 monitors shaft 17 and generates in response rotor position information $\theta_{rm}$ that is provided in feedback to controller 12. Examples of a rotor position detection device include an encoders and resolvers. In other embodiments, rotor position detection is determined by controller 12 based on monitored feedback (e.g., monitored phase currents $\hat{i}_a$, $\hat{i}_b$, and $\hat{i}_c$) using a "sensorless" algorithm, in which no dedicated device (such as an encoder) is required to monitor shaft 17. Based on the provided inputs, controller 12 generates current command signals to control the operation of SRM 16. In particular, controller 12 shapes the profile of the phase currents provided to SRM 16 to minimize torque harmonics.

Figure 2:
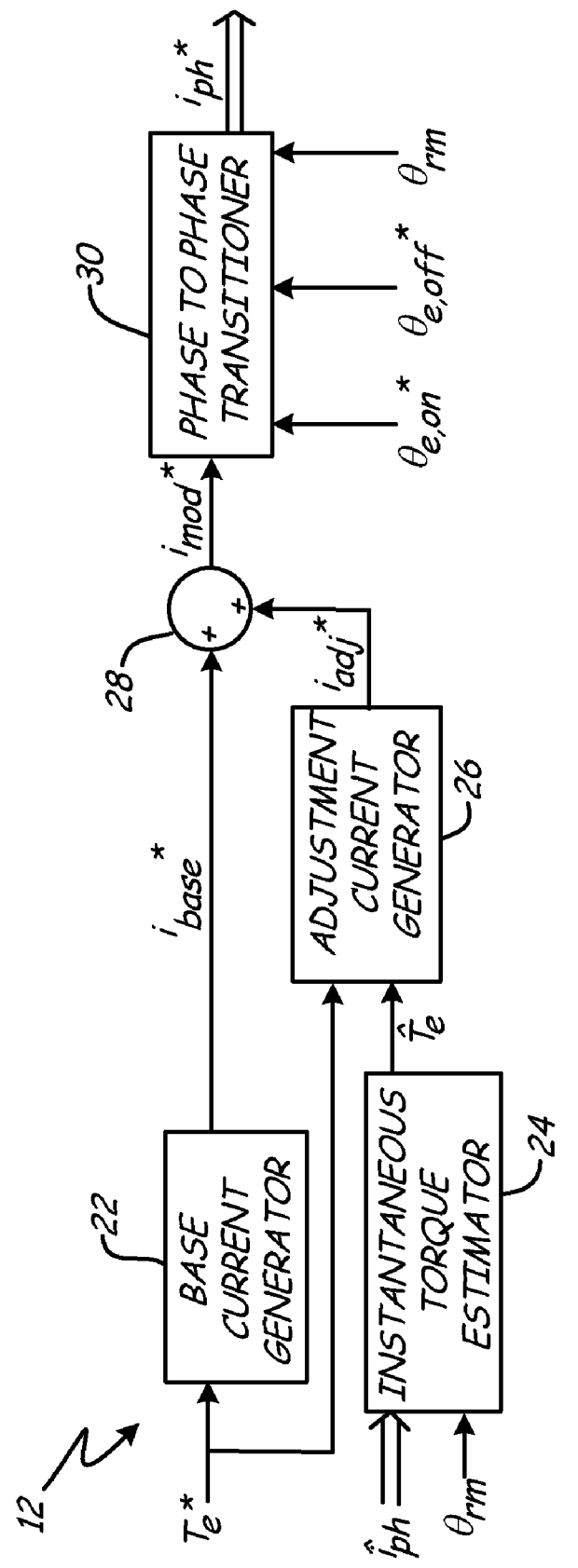
FIG. 2 is a block diagram illustrating operations performed by a controller according to an embodiment of the present invention.

FIG. 2 is a block diagram illustrating functions performed by controller 12 according to an embodiment of the present invention. These functions may be implemented by dedicated hardware components or by one or more processors, digital signal processors (DSPs), field-programmable gate arrays (FPGAs), etc., that in combination with software components implement modules for performing the functions shown. Controller 12 includes base current generator 22, instantaneous torque estimator 24, adjustment current generator 26, summer block 28, and phase-to-phase transitioner 30. The following table lists the signals received, operated on, and generated by controller 12 in the embodiment shown in FIG. 2 (as well as additional signals provided in FIG. 3).

| Symbol | Description |
| --- | --- |
| $T_e^*$ | Torque Command |
| $i_{base}^*$ | Base Current Command |
| $\hat{i}_{ph}$ | Monitored Phase Currents (plural) |
| $\theta_{rm}$ | Rotor Position Angle |
| $\hat{T}_{e,ph}$ | Torque Estimate (plural) |
| $\hat{T}_e$ | Torque Estimate (summed) |
| $\Delta T_e^*$ | Error between Commanded Torque and Estimated Torque |
| $i_{adj}^*$ | Adjusted Current Command |
| $i_{mod}^*$ | Modified Current Command Sum of $i_{adj}^*$, $i_{base}^*$ |
| $i_{ph}^*$ | Phase Current Command(plural) |
| $\theta_{e,on}^*$, $\theta_{e,off}^*$ | Turn-on, Turn-off Angle Commands |
| $\alpha$ | Commanded Phase Current Multiplier |

Figure 4:
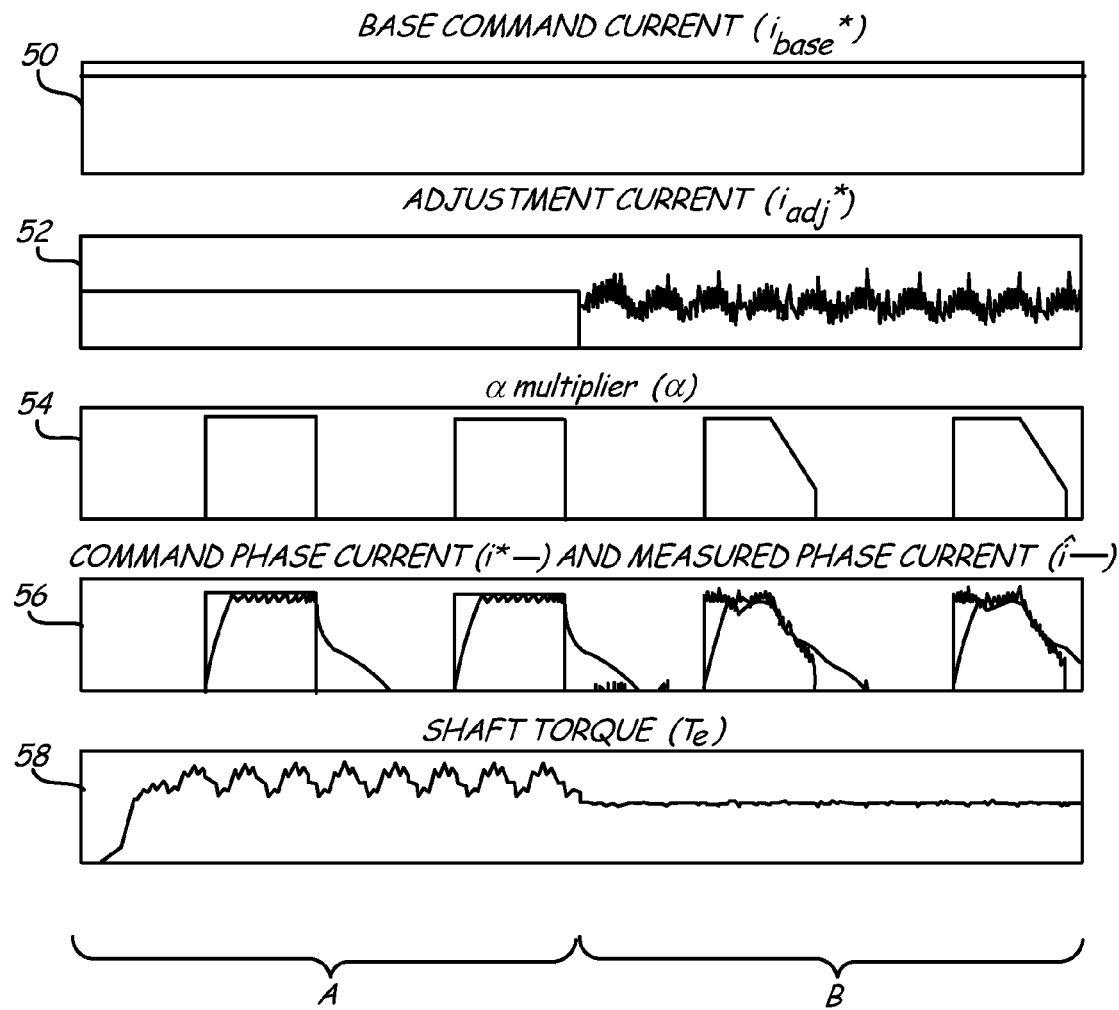
FIG. 4 is a plurality of waveforms from a simulation illustrating the operation of the controller according to an embodiment of the present invention.

Commanded torque $T_e^*$ represents the desired torque to be supplied by SRM 16. The torque generated by SRM 16 is related, in part, to the magnitude of the current provided by driver 14 to SRM 16. Base current generator 22 determines based on the commanded torque $T_e^*$ the magnitude of the current required (i.e., base current command $i_{base}^*$). Prior art control schemes may control SRM 16 based solely on base current command $i_{base}^*$, which when combined with turn-on angle $\theta_{e,on}^*$ and turn-off angle $\theta_{e,off}^*$ results in rectangular waveforms being applied sequentially to each phase of SRM 16. As shown in FIG. 4, this control scheme results in the generation of torque harmonics.

In the embodiment shown in FIG. 2, base current command $i_{base}^*$ is modified or shaped to reduce torque harmonics. Instantaneous torque estimator 24 generates an estimate of the instantaneous torque $\hat{T}_e$ generated by SRM 16 based on the monitored phase currents $\hat{i}_{ph}$ and the monitored rotor position $\theta_{rm}$. The torque estimate $\hat{T}_e$ is compared to the commanded (i.e., desired torque) $T_e^*$ by adjustment current generator 26. In response, adjustment current generator generates adjusted current command $i_{adj}^*$ that represents the phase current required to correct the error between the estimated torque $\hat{T}_e$ and the commanded torque $T_e^*$. Summer block 28 adds the adjusted current command $i_{adj}^*$ to the base current command $i_{base}^*$ to generate a modified current command $i_{mod}^*$.

In addition, phase-to-phase transitioner 30 acts to smooth the hand-off between sequential energization of stator field coils (i.e., between stator phases). Transitioner 30 receives as input the modified current command $i_{mod}^*$, turn-on angle $\theta_{e,on}^*$, turn-off angle $\theta_{e,off}^*$, and monitored rotor position $\theta_{rm}$. Turn-on angle $\theta_{e,on}^*$ and turn-off angle $\theta_{e,off}^*$ may remain constant during operation of SRM 16 or may be selectively varied by controller 12 based on the speed and/or torque demand of SRM 16. For purposes of this discussion, the turn-on angle $\theta_{e,on}^*$ and the turn-off angle $\theta_{e,off}^*$ are represented merely as inputs to controller 12, without discussion of specific control means used to calculate the angles. Turn-on angle $\theta_{e,on}^*$ represents the position at which a particular phase is energized. Thus, when the monitored rotor position crosses the turn-on angle $\theta_{e,on}^*$, a phase current according to the generated current command $i_{mod}^*$ is provided on the desired phase. Likewise, the turn-off angle $\theta_{e,off}^*$ represents the position at which energization is removed from a particular phase. However, the inductance associated with the stator field coils resists instantaneous change to the phase currents. In particular, following the turn-off angle $\theta_{e,off}^*$, current continues to flow in the stator field windings for a period of time, resulting in additional, torque harmonic generation. To counteract this, phase-to-phase transitioner 30 further modifies the modified current command $i_{mod}^*$ at the phase-to-phase transitions. For example, as the monitored rotor position $\theta_{rm}$ approaches the turn-off angle $\theta_{e,off}^*$, the magnitude of the modified current command is decreased such that when the turn-off angle $\theta_{e,off}^*$ is crossed, the current provided on the phase to be turned off has already been decreased.

In this way, controller 12 generates an adjusted current command $i_{adj}^*$ that takes into account the instantaneous torque generated by SRM 16. The adjusted current command $i_{adj}^*$ is employed to modify the base current command $i_{base}^*$. In addition, the modified current command $i_{mod}^*$ is further modified to smooth phase-to-phase transitions by selectively decreasing the magnitude of the modified current command as the monitored rotor position approaches the turn-off angle $\theta_{e,off}^*$.

Figure 3:
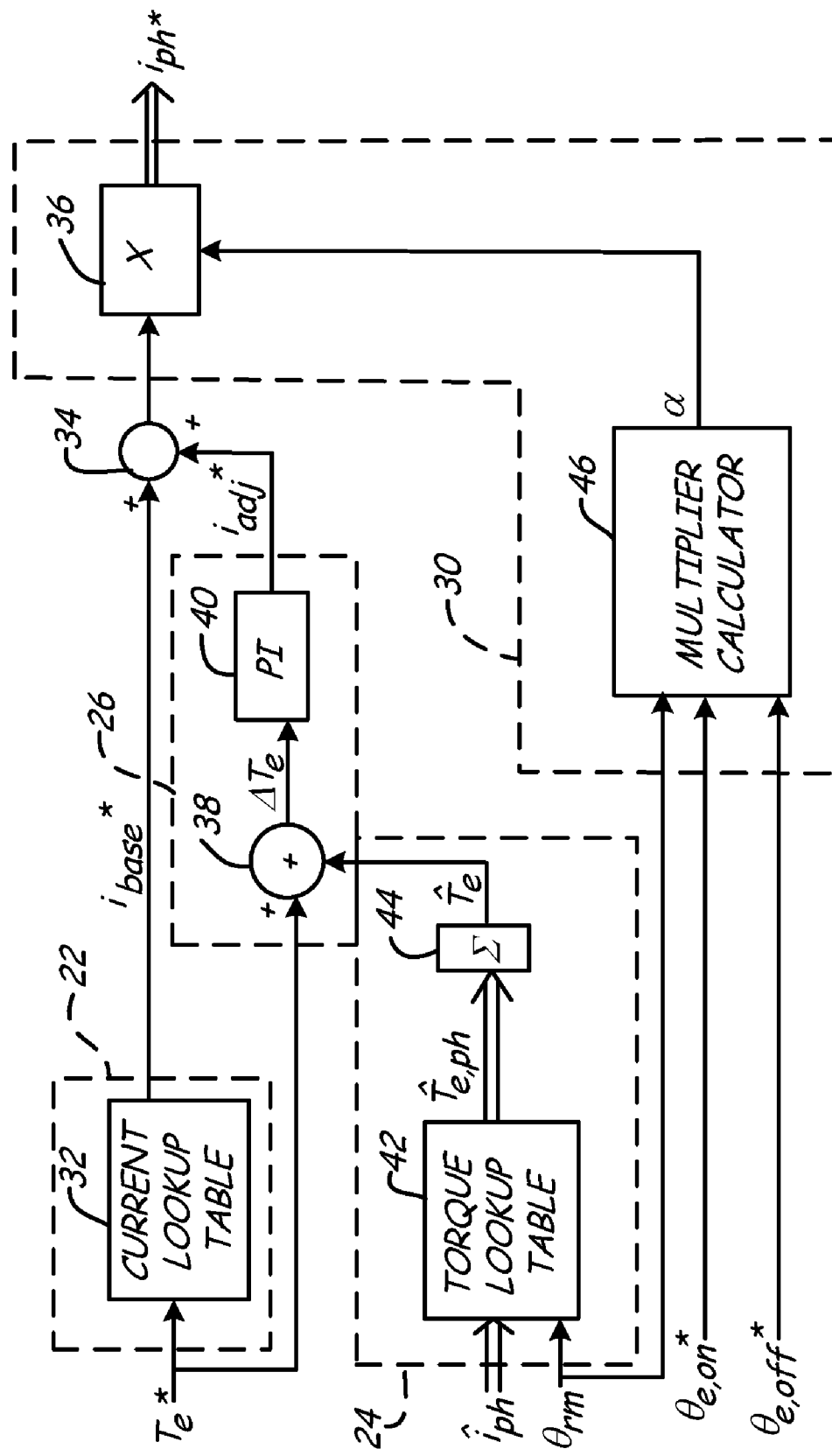
FIG. 3 is a block diagram illustrating in operations performed by a controller according to another embodiment of the present invention.

FIG. 3 is a block diagram illustrating in more detail operations performed by controller 12 according to an embodiment of the present invention. In the embodiment shown in FIG. 3, controller 12 is shown as once again including base current generator 22, instantaneous torque estimator 24, adjustment current generator 26, summer 34, and phase-to-phase transitioner 30. Each of these elements is shown in additional detail according to an embodiment of the present invention. Base current generator 22 includes current command lookup table 32, instantaneous torque estimator 24 includes torque lookup table 42 and summation block 44, adjustment current generator 26 includes error block 38 and proportional-integral block 40, and phase-to-phase transitioner 30 includes multiplier calculator 46 and multiplier block 36.

In response to the input torque command $T_e^*$, current lookup table 32 generates a base current command $i_{base}^*$ that represents the current required to generate the desired torque. In addition, the monitored phase currents $\hat{i}_{ph}$ and monitored rotor position $\theta_{rm}$ are provided to torque lookup table 42, which in response generates an estimated torque $\hat{T}_{e,ph}$ with respect to each phase of SRM 16. The estimated torque values $\hat{T}_{e,ph}$ are summed by summation block 44 to generate a single estimated torque value $T_e$, representing the total torque generated by SRM 16. The error or difference ($\Delta T_e$) between the commanded torque $T_e^*$ and the estimated torque $\hat{T}_e$ is generated by error block 38. The torque error $\Delta T_e$ is provided to P-I controller 40, which in response generates an adjusted current command $i_{adj}^*$. As described with respect to FIG. 2, above, the adjusted current command $i_{adj}^*$ represents the adjustment to the base current $i_{base}^*$. As discussed with respect to FIG. 2, adjusted current command $i_{adj}^*$ represents the phase current required to correct the error between the estimated torque $\hat{T}_e$ and the commanded torque $T_e^*$. The adjusted current command $i_{adj}^*$ is summed with the base current command $i_{base}^*$ by summer block 34.

In the embodiment shown in FIG. 3, phase-to-phase transition smoothing is provided by computing a multiplier $\alpha$ based on the monitored rotor position that is multiplied with the adjusted current command $i_{adj}^*$ at multiplier block 36 to generate the phase current command $i_{ph}^*$. A multiplier $\alpha$ equal to one results in no change to the adjusted current command $i_{adj}^*$, a multiplier $\alpha$ equal to zero results in the adjusted current command $i_{adj}^*$ being equal to zero, and values of multiplier $\alpha$ between zero and one result in some decrease of the adjusted current command $i_{adj}^*$.

The multiplier $\alpha$ is computed by multiplier calculator 46 based on the monitored rotor position $\theta_{rm}$, the turn-on angle $\theta_{e,on}^*$, and the turn-off angle $\theta_{e,off}^*$ to ramp down the current command as the monitored rotor position approaches the turn-off angle $\theta_{e,off}^*$. In one embodiment, the multiplier $\alpha$ (for a particular phase) is set equal to one when the monitored rotor position $\theta_{rm}$ crosses the turn-on angle $\theta_{e,on}^*$ for a particular phase, such that the adjusted current command is provided unchanged to driver 14. When the monitored rotor position $\theta_{rm}$ crosses a droop angle $\theta_{droop}$ (located between the turn-on angle $\theta_{e,on}*$ and the turn-off angle $\theta_{e,off}*$), the multiplier $\alpha$ is decreased according to some function until the turn-off angle $\theta_{e,off}*$ is crossed. The function used to decrease the multiplier $\alpha$ may be linear or non-linear, depending on the particular application. Upon crossing the turn-off angle $\theta_{e,off}*$, the multiplier $\alpha$ for that phase is set equal to zero to remove the commanded current from the selected phase. As a result, the phase current commands $i_{ph}*$ provided in this embodiment decrease torque harmonics in SRM 16.

FIG. 4 is a plurality of waveforms simulating the operation of the system 10 according to an embodiment of the present invention. Waveform 50 illustrates a base current command signal $i_{base}*$, maintained at a constant value throughout the simulation. Waveform 52 illustrates adjusted current command $i_{adj}*$ generated based on a calculated difference between the torque command $T_e*$ and the estimated torque $\hat{T}_e$. Waveform 54 illustrates the multiplier $\alpha$ generated based on the monitored rotor position $\theta_{rm}$. Waveform 56 illustrates the commanded phase current $i_{ph}*$ provided by the output of controller 12 and the monitored phase currents $i_{ph}$ provided to SRM 16 as a result of the commanded phase current $i_{ph}*$. Waveform 58 illustrates the resulting torque generated by SRM in response to the provided phase currents $i_{ph}$.

With respect to each waveform, the left-side (labeled 'A') of the waveform illustrates a prior art control method in which only the base commanded current $i_{base}$ and unity multiplier $\alpha$ (between the turn-on angle $\theta_{e,on}*$ and turn-off angle $\theta_{e,off}*$) are employed to generate the phase current command $i_{ph}*$. The right-side (labeled 'B') of the waveform illustrates the control system according to an embodiment of the present invention, in which the adjusted current command $i_{adj}*$ is calculated based on differences between the commanded torque $T_e*$ and the estimated torque $\hat{T}_e$ and added to the base current command $i_{base}*$. In addition, phase-to-phase smoothing is provided by decreasing the multiplier $\alpha$ between the droop angle $\theta_{droop}$ and the turn-off angle $\theta_{e,off}$.

As a result of these control methods, the monitored shaft torque is decreased significantly with respect to the torque monitored based on the prior art method. The present invention therefore provides a control system that minimizes torque harmonics in switched reluctance machines.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A switched reluctance machine (SRM) system, comprising:
    a SRM having field coils that define a plurality of phases and a rotor having at least two poles;
    a controller for generating current command signals, the controller connected to receive a torque command, a turn-on angle, a turn-off angle, monitored phase currents and the monitored rotor position, wherein the controller calculates a base current command based on the torque command, estimates instantaneous torque of the SRM based on the monitored phase currents and the monitored rotor position, wherein the controller generates the current command signals by modifying the base current command based on a calculated difference between the estimated torque and the torque command value, and further modifies the base current command using a multiplier value that varies with respect to the monitored rotor position to provide a smooth phase-to-phase transition; and
    a driver connected to provide phase currents to the field coils of the SRM based on the current command signals received from the controller.

2. The system of claim 1, wherein the controller provides the monitored phase currents and the monitored rotor position to a look-up table to estimate the instantaneous torque of the SRM.

3. The system of claim 1, wherein the controller generates an adjusted current command based on the difference between the estimated torque and the commanded torque and modifies the base current command by adding the adjusted current command to the base current command.

4. The system of claim 1, wherein the controller sets the multiplier value for a given phase equal to one in response to the monitored rotor position crossing the turn-on angle, causes the multiplier to decrease in response to the monitored rotor position crossing a droop angle, and sets the multiplier equal to zero in response to the monitored rotor position crossing the turn-off angle.

5. The system of claim 1, wherein the controller selects the turn-on angle and the turn-off angle based on operation of the SRM.

6. The system of claim 1, wherein the controller includes a sensorless algorithm for detecting rotor position based on the monitored phase currents.

7. The system of claim 1, further including:
    a rotor position detection device that monitors the SRM to detect rotor position.

8. A method of controlling a switched reluctance machine (SRM) having a stator portion and a rotor portion, the stator portion having at least two phases of field coils that are sequentially energized, the method comprising:
    receiving inputs representing monitored phase currents provided to each phase of the SRM and rotor position of the SRM;
    estimating torque generated by the SRM based on the monitored phase currents and the monitored rotor position;
    comparing the estimated torque to a commanded torque value to calculate a torque error value;
    generating an adjusted current command based on the torque error value;
    adding the adjusted current command to a base current command to generate a modified current command; and
    generating phase current commands for selectively controlling the energizing of each of the stator by multiplying the modified current command with phase multipliers, wherein the phase multipliers vary based on the monitored rotor position.

9. The method of claim 8, wherein estimating torque generated by the SRM includes estimating torque with respect to each phase of the SRM and summing the estimated torque values for all phases to generate the estimated torque.

10. The method of claim 8, wherein a proportional-integral (P-I) controller is employed to generate the adjusted current command based on the torque error value.

11. The method of claim 8, wherein generating phase current commands includes:

setting a phase multiplier for a given phase equal to one when the monitored rotor position crosses a turn-on angle;

decreasing the phase multiplier for the given phase according to a defined function when the monitored rotor position crosses a droop angle; and setting the phase multiplier for the given phase equal to zero when the monitored rotor position crosses a turn-off angle.

12. A controller for controlling the operation of a switched reluctance machine (SRM), the controller comprising:

inputs to receive a torque command value, monitored phase currents provided to the SRM and a monitored rotor position associated with the SRM;

a base current module that generates a base current command based on the received torque command value;

a torque estimation module that estimates torque associated with the SRM based on the monitored phase currents and the monitored rotor position;

an adjustment current module that compares the torque command value to the estimated torque and generates in response an adjusted current command;

a summer module that sums the based current command with the adjusted current command;

a phase-to-phase transition module that further modifies the adjusted current command based on the monitored rotor position to provide a smooth transition between phase hand-offs; and an output for connection to a driver, wherein the output provides the phase current commands generated by the phase current shaping module to the driver for generation of phase current to the SRM.

13. The controller of claim 12, wherein the based current module is a lookup table that provides the base current command based on the received torque command value.

14. The controller of claim 12, wherein the torque estimation module is a lookup table that estimates torque generated by the SRM based on the monitored phase currents and the monitored rotor position of the SRM.

15. The controller of claim 12, wherein the phase-to-phase transition module multiplies the adjusted current command by a multiplier value that varies based on the monitored rotor position.

16. The controller of claim 15, wherein the multiplier is set equal to one when the monitored rotor position crosses a turn-on angle, begins ramping down according to a defined function when the monitored rotor position crosses a droop angle, and is set equal to zero when the monitored rotor position crosses a turn-off angle.

17. The controller of claim 16, wherein the turn-on angle and the turn-off angle are selectively varied by the controller based on the operation of the SRM.

18. The controller of claim 12, wherein the monitored rotor position is provided by a rotor position monitoring device.

19. The controller of claim 12, wherein the controller calculates the monitored rotor position based on the monitored phase currents using a sensorless detection algorithm.

* * * * *